United States Patent [19]
Kori

[11] Patent Number: 6,092,170
[45] Date of Patent: *Jul. 18, 2000

[54] DATA TRANSFER APPARATUS BETWEEN DEVICES

[75] Inventor: Mitsunori Kori, Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/978,442

[22] Filed: Nov. 25, 1997

[30] Foreign Application Priority Data

Nov. 29, 1996 [JP] Japan ................................. 8-319719
Oct. 13, 1997 [JP] Japan ................................. 9-278353

[51] Int. Cl.[7] ....................................................... G06F 12/00
[52] U.S. Cl. ................................. 711/202; 711/4; 710/26; 710/128
[58] Field of Search ..................... 711/202, 4; 395/308, 395/182.04, 846; 714/6

[56] References Cited

U.S. PATENT DOCUMENTS 5,193,184  3/1993  Belsan et al. ............................ 711/4
5,621,882  4/1997  Kakuta ................................. 395/182.04
5,659,798  8/1997  Blumrich et al. ....................... 395/846
5,771,359  6/1998  Galloway et al. ....................... 395/308

OTHER PUBLICATIONS

I$_2$O–Intelligent I/O, Peer–to–Peer Proposal, Revision 0.14, version 7, Oct. 2, 1997, p. 126.

TANDEM, ServerNet Interconnect Technology, pp. 1 and 4.

Primary Examiner—Do Hyun Yoo
Assistant Examiner—Nasser Moazzami
Attorney, Agent, or Firm—Leydig, Voit & Mayer

[57] ABSTRACT

An information processing system directly transfers data in file units between devices of a system including a central processing unit and a main memory unit connected to the devices. An address in a physical address space is assigned to a device memory. The assigned address is mapped to a user space in a virtual address space. An address translation table in the main memory unit performs an address translation of the virtual address space and the physical address space. Therefore, the system can treat the device memory as a buffer in the main memory unit.

18 Claims, 13 Drawing Sheets

| PHYSICAL ADDRESS | MEMORY SIZE |
|---|---|
| × × × × × | × × × × × |

85 — PHYSICAL ADDRESS
86 — MEMORY SIZE

DATA TRANSFER APPARATUS BETWEEN DEVICES

BACKGROUND OF THE INVENTION

1. Field of the Invention

The invention relates to a direct data transfer, by an address mapping scheme, between a plurality of devices connected to a bus.

A direct data transfer between a plurality of devices in a system having a processor is generally not possible, because a data is first sent from a device to a main memory unit by a DMA (Direct Memory Access) controller, then this data is sent from the main memory unit to an another device by a DMA controller of the other device. For this reason, the data transfer between devices is time consuming. In addition, a high load on the main memory upon data transfer slow the rate of the data transfer between a central processing unit and the main memory unit.

To shorten the time and to reduce the load on the main memory unit, there is a method to perform the direct data transfer between devices under a control of input/output (I/O) processors such as I/O controllers, without involving the main memory unit. Such data transfer is performed under the control of an I/O processor using its special monitor program. Normally, for input/output operations, a structure of file and a buffering control of main memory unit are under control of the operating system, rather than the I/O processor. That is, the I/O processor can perform the input/output operations using a physical block number converted by the operating system. The I/O processor cannot perform the I/O operations using a logical unit of data called a file or a record.

The reasons for not being able to perform I/O at the logical unit of data (file or record) follows. In general, the structure of file and the buffering control of main memory will be different for different operating systems and file systems, therefore, if the I/O processor is designed to have a function that relies on a certain file structure and a certain buffering operation, since the I/O processor is reliant on the specific operating system and the file system, when modifying or exchanging the operating system and the file system, the I/O processor must also be modified or exchanged. In addition, function allotments for the operating system and the I/O processor must be changed extensively.

2. Description of the Related Art

Figure 9:
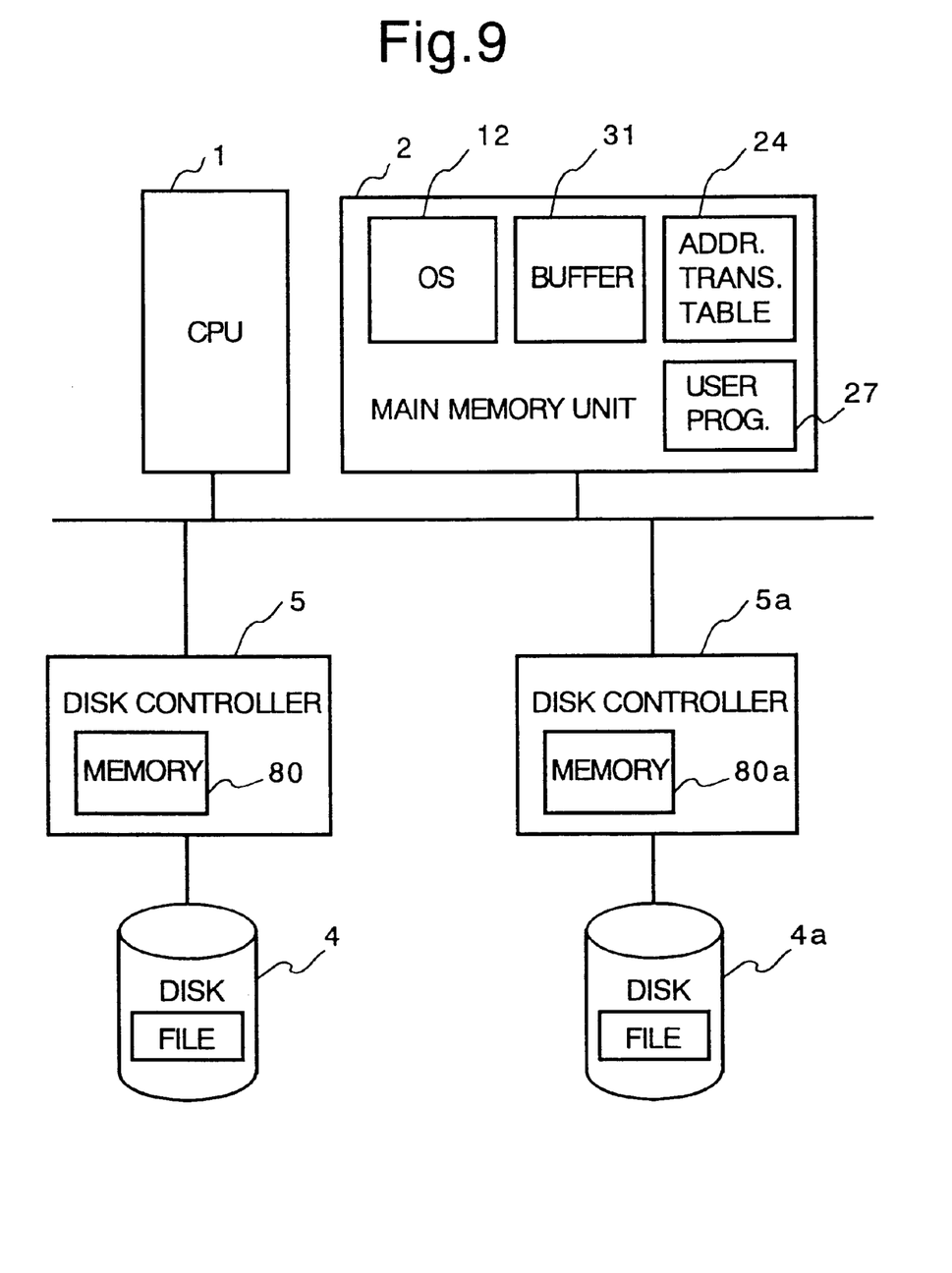
FIG. 9 is a schematic view of system configuration for the related art.
Figure 10:
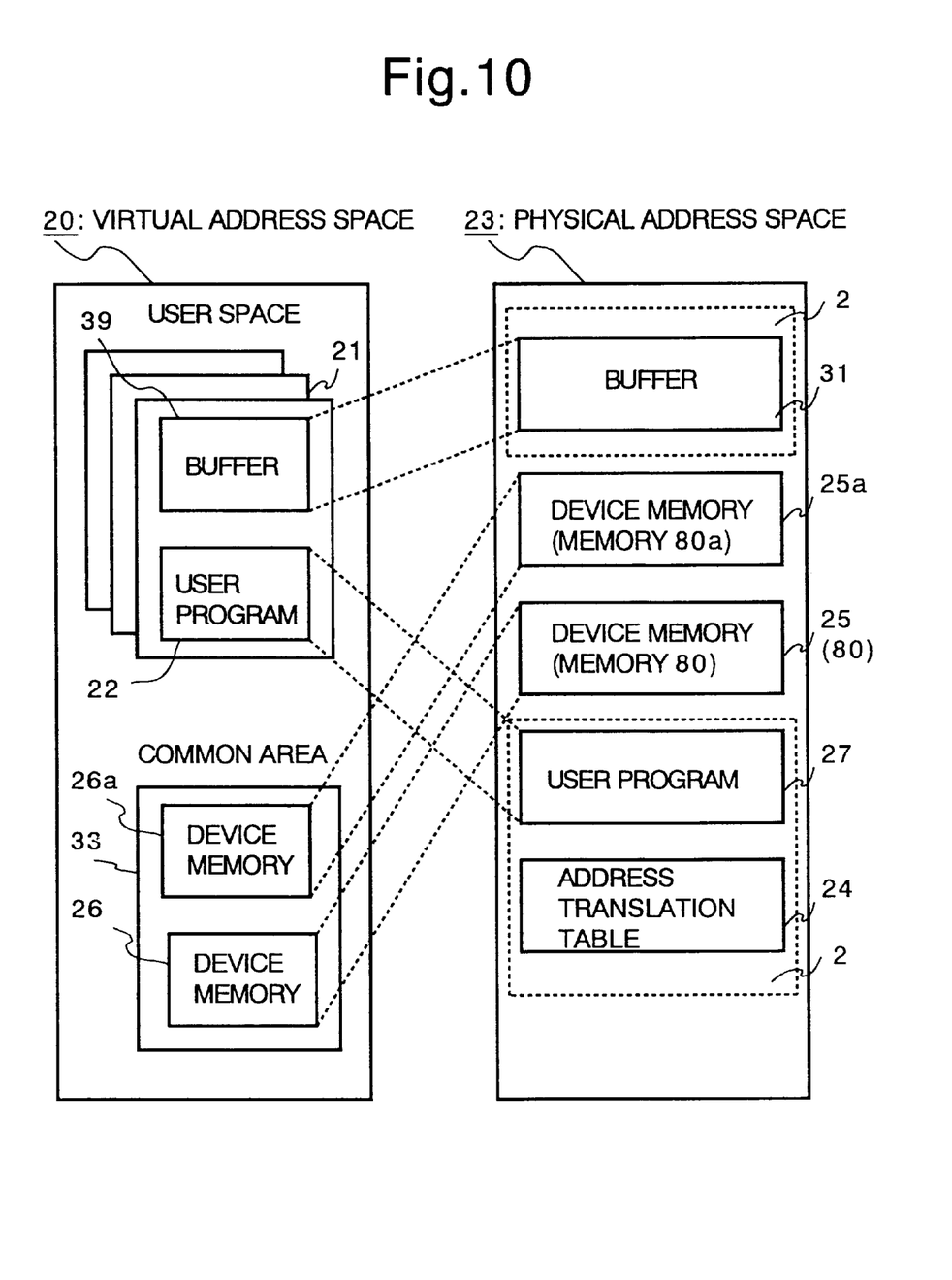
FIG. 10 illustrates a state of mapping for the related art.

FIG. 9 is a schematic view of conventional configuration for direct data transfer between devices. FIG. 10 illustrates states of a virtual address space and a physical address space. A description of numbered components indicated in FIG. 9: is as follows a central processing unit 1 (CPU); a main memory unit 2; magnetic disk drives 4 and 4a; disk controllers 5 and 5a; and memories 80 and 80a. Following is the description of numbered components indicated in FIG. 10: a physical address space 23; a virtual address space 20; a user space 21; a user program 22; a buffer 39; device memories 26 and 26a; device memories 25 and 25a; and an address translation table 24. The physical address space is a range of addresses that the CPU can physically and directly access. For example, the physical address space of a CPU which can specify addresses having 32 bits is $2^{32} \approx 4G$. The user space 21 is an area where the user program 22 can make a direct access in the virtual address space 20. The buffer 32 is an area used by the user program 22 for data input/output. The common area 33 in the virtual address space 20 is a memory area which is used by the operating system. The remaining virtual address space not used by the operating system is assigned to the user spaces. Each user space is assigned to different parts of virtual address space. The device memories 25 and 25a assigned to the physical address space 23 are mapped to device memories 26 and 26a of the common area 33. The device memories 25 and 25a are the memories 80 and 80a inside the disk controllers 5 and 5a. The memories 80 and 80a can be directly accessed by the operating system. These memories receives read and write commands to the magnetic disk controller from the operating system. The operating system performs address translation from the device memories 26 and 26a which is mapped to the virtual address space 20 to the device memories 25 and 25a according to the address translation table 24 in the physical address space 23.

An advantage of assigning the memory area used by the operating system to the common area 33 is that a common process can be executed when a control moves from a user program to the operating system by a system call or an interrupt from any of the address space. Also, by assigning the device memories 25 to the common area 33, it becomes possible for the operating system to operate a device. For example, when the operating system writes a read command to the device memory 25 for a file, the disk controller 5 executes the read command and transfers the file stored at the magnetic disk drive 4 to the buffer 31 of the main memory unit 2. Likewise, when the operating system writes a write command to the device memory 25a for the file, the disk controller 5 executes the write command and transfers the file to the magnetic disk drive 4a from the buffer 31 of the main memory unit 2. Thus, a data transfer in file unit becomes possible by the operating system.

The conventional configuration of direct data transfer between devices and the states of virtual address space 20 and physical address 23 are described accordingly. Since the I/O processor does not know the file structure or the buffering operation, I/O control at a logical unit, such as a file is not possible for the I/O processor. On the other hand, for an interface level of system call of the operating system, a source address of transfer or a destination address of transfer for file input/output has to be the main memory unit 2 which is mapped to the user space 21. An address of source or destination of transfer must be specified using the virtual address. However, the virtual address corresponding to device memory 25 is not present at the user space 21 where the user program 22 can direct access, therefore, the input/output operations of file (where device memory is source of transfer or destination of transfer) is not possible for the user program 22. The virtual address corresponding to device memory 25 is present at common area 33. The common area 33 is an area used by the operating system so the user program 22 can not make a direct access to the common area 33.

A problem with the conventional data transfer apparatus between devices and its method is, when the I/O processor is being used, direct data transfer is only possible in physical block units, and data transfer is not possible in logical file units or logical record units.

SUMMARY OF THE INVENTION

The invention attempts to solve this problem, aiming to obtain an effective data transfer apparatus between devices and its method where transfer in logical units (file units or record units) is possible.

These and other objects are accomplished by the present invention as herein after described in further detail.

According to one aspect of the present invention, a data transfer apparatus has a central processing unit, a main memory unit, a plurality of devices and an address translation table. The apparatus translates an address of a virtual address space to an address of a physical address space, and transfers data between the plurality of devices.

The apparatus is comprising:
a) a mechanism for assigning a device memory to the physical address space;
b) a mechanism for mapping the assigned address to an user space in the virtual address space;
c) a mechanism for translating the address of user space in the virtual address space to the address of physical address space using the address translation table; and
d) a mechanism for transferring a data using the translated address as one of a destination address or a source address.

The data transfer apparatus executes one of a data transfer from a disk drive to one device, and a data transfer from one device to a disk drive.

The device includes a processor and a memory, wherein the memory transfers data in physical block unit.

The assigning mechanism includes a mechanism for storing a top address of the device memory assigned in the physical address space as a physical address of a configuration table.

The mapping mechanism includes a mechanism for storing a size of the device memory mapped to the user space as a memory size of the configuration table.

The translating mechanism includes a mechanism for treating the device memory, which is indicated by the memory size and the physical address in the configuration table, as a buffer of the user space where data is transferred.

The transferring mechanism includes a mechanism for issuing a request to a source device to transfer data to the buffer of user space from the source device.

The translating mechanism includes a mechanism for treating the device memory, which is indicated by the memory size and the physical address in configuration table, as a buffer of the user space where data to be transferred is stored.

The transferring mechanism includes a mechanism for issuing a request to a destination device to transfer data from the buffer of the user space to the destination device.

According to an another aspect of the invention, a data transfer method is for data processing system having a central processing unit, a main memory unit, a plurality of devices and an address translation table. The method translates an address of a virtual address space to an address of a physical address space, and transfers data between the plurality of devices. The method is comprising steps of:
a) assigning a device memory to the physical address space;
b) mapping the assigned address to an user space in the virtual address space;
c) translating the address of user space in the virtual address space to the address of physical address space using the address translation table; and
d) transferring a data using the translated address as one of a destination address or a source address.

The data transfer method includes a step of one of a data transfer from a disk drive to one device, and a data transfer from one device to a disk drive.

The device includes a processor and a memory, and the transferring step includes a step of performing a memory transfer in physical block unit.

The assigning step includes a step for storing a top address of the device memory assigned in the physical address space as a physical address of a configuration table.

The mapping step includes a step for storing a size of the device memory mapped to the user space as a memory size of the configuration table.

The translating step includes a step for treating the device memory, which is indicated by the memory size and the physical address in the configuration table, as a buffer of the user space where data is transferred.

The transferring step includes a step for issuing a request to a source device to transfer data to the buffer of user space from the source device.

The translating step includes a step for treating the device memory, which is indicated by the memory size and the physical address in configuration table, as a buffer of the user space where data to be transferred is stored.

The transferring step includes a step for issuing a request to a destination device to transfer data from the buffer of the user space to the destination device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein.

DETAILED DESCRIPTION OF THE PREFERRED EMBODIMENTS

Reference will now be made in detail to the present preferred embodiments of the invention, examples of which are illustrated in the accompanying drawings, wherein like reference numerals indicate like elements throughout the several views.

Embodiment 1.

Figure 1:
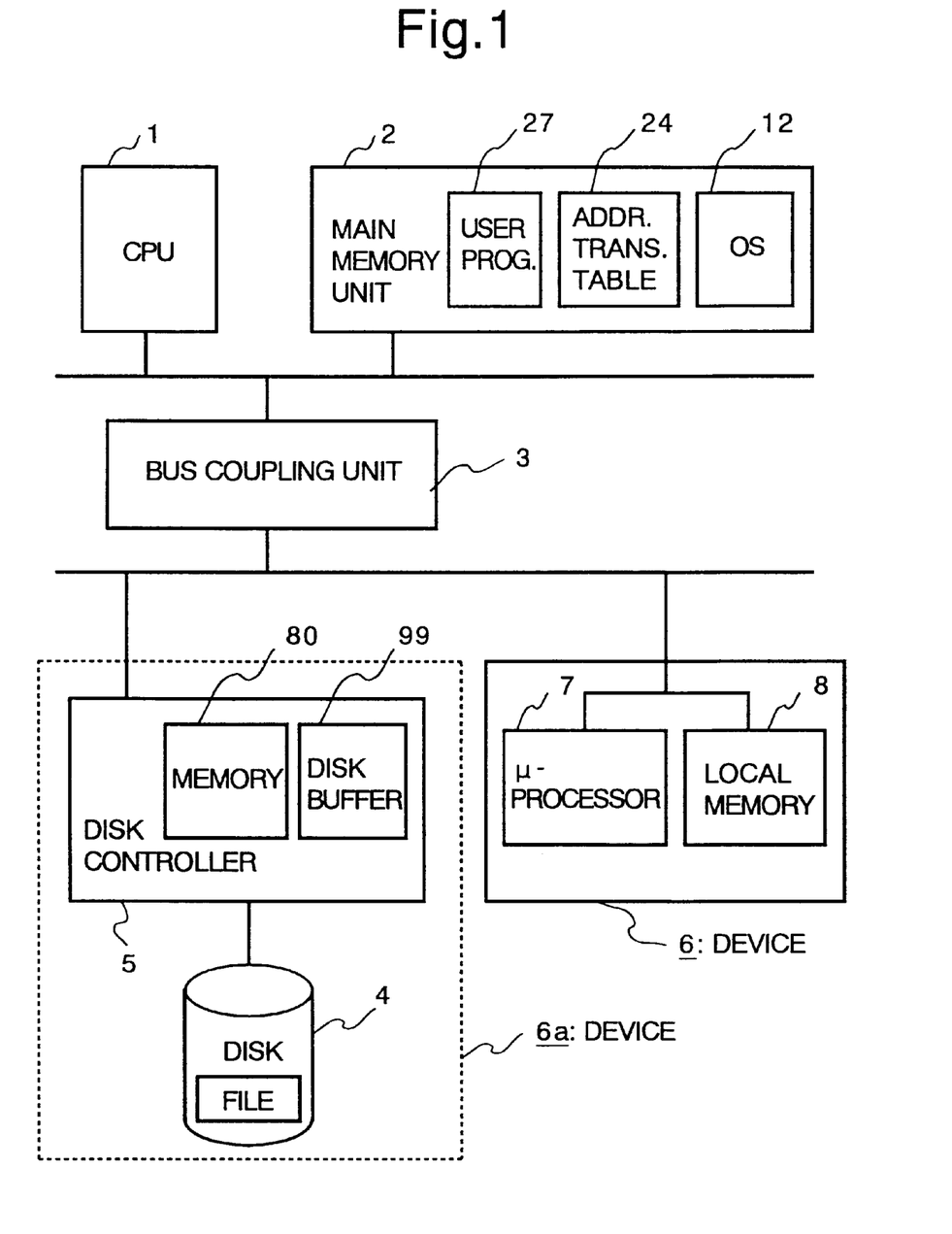
FIG. 1 is a schematic view of system configuration for the embodiment 1.

FIG. 1 is a system configuration of a data transfer apparatus between devices and an implementation of its method for the embodiment 1. A central processing unit (CPU 1) controls all devices in the system. A main memory unit 2 stores an operating system (OS) which controls software of the system. A bus coupling unit 3 connects all the buses, which is equivalent to, for example, a bridge. A magnetic disk drive 4 is controlled by a disk controller 5. A device 6a is configured from the magnetic disk drive 4 and the disk controller 5. A device 6 is mainly configured of a microprocessor 7 and a local memory 8. Normally, a plurality of devices 6 are connected in the system. The embodiment 1 aims to explain direct data transfer or direct file transfer between the magnetic disk drive 4 (a device 6a) and each of the devices 6.

Figure 2:
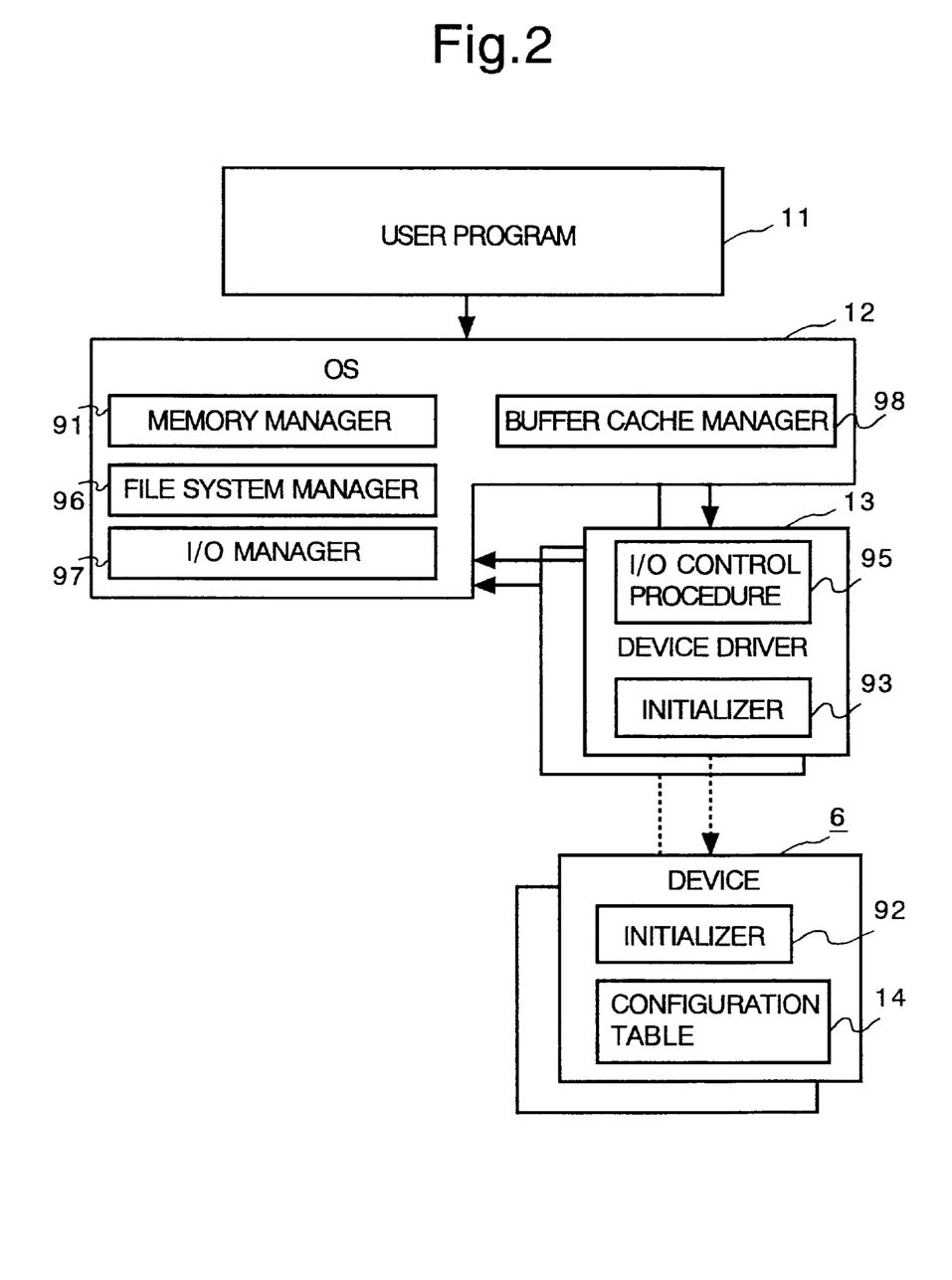
FIG. 2 is a schematic view of software configuration for the embodiment 1.
Figure 11:
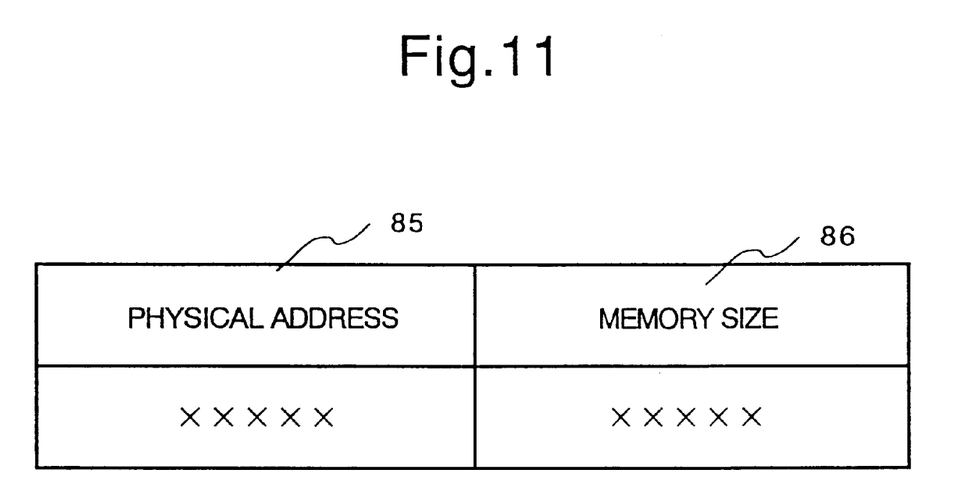
FIG. 11 illustrates a configuration table.

FIG. 2 illustrates a configuration of software and a relation between the software and the device 6. A user program 11 is a data processing program e.g., a program used in financial management and inventory control. An operating system 12 controls the operation of the system. A device driver 13 is configured in the operating system 12 to control the device 6. For every type of device 6, there is a device driver 13. Each device 6 includes a configuration table 14. The configuration table 14 stores an information relating to each device 6. As FIG. 11 illustrates, the configuration table 14 stores a physical address 85 assigned to each device and a memory size 86. The physical address 85 is set to respond to a request to the device or to store data. A value of the physical address is not fixed, but it can be set arbitrarily at the configuration table 14, by operating system or other processing unit, as will be described later.

Figure 3:
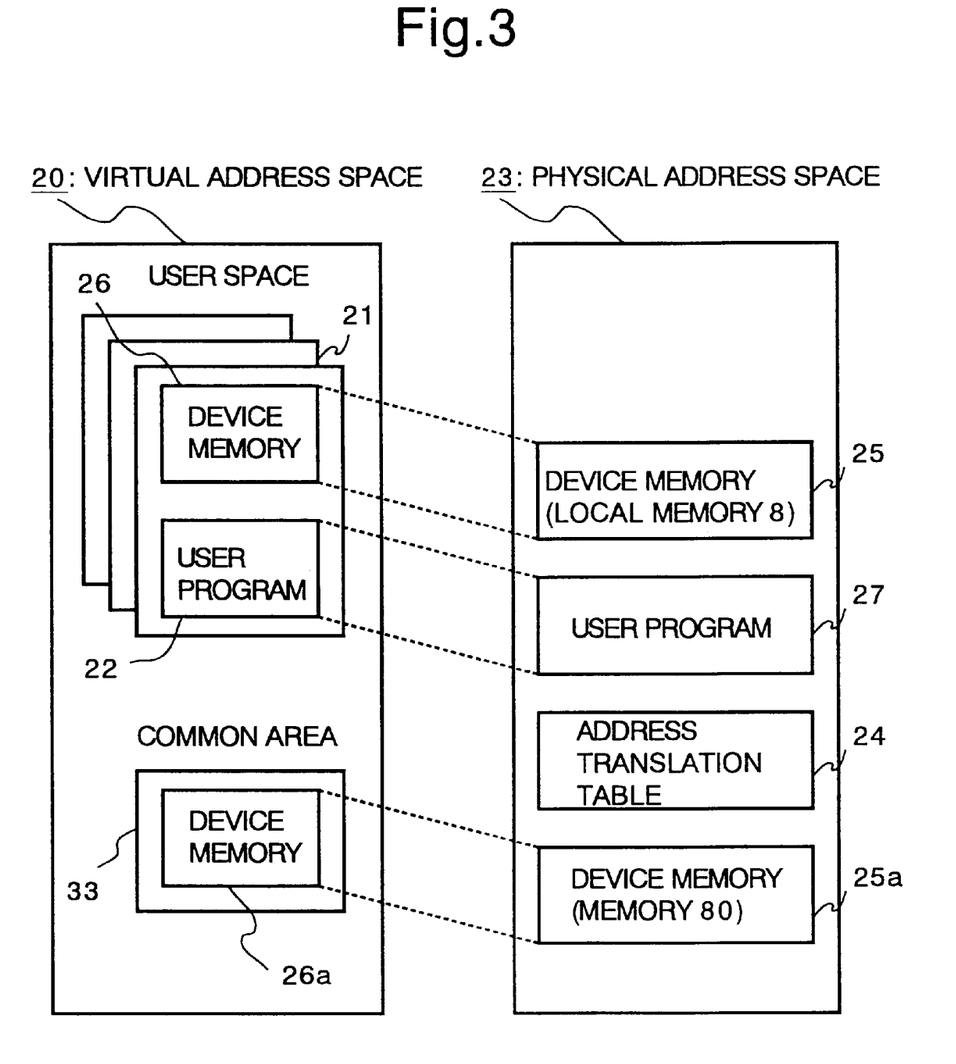
FIG. 3 is illustrating state of mapping for the embodiment 1.

FIG. 3 illustrates a states of virtual address space and physical address space for the embodiment 1. A user space 21 is an area that can be accessed from a user program 22. A plurality of user spaces 21 are respectively set for the user programs 22. The user spaces 21 are isolated from each other to maintain security. The operating system 12 is executed in the common area 33 of virtual address space. The common area is also used by the operating system 12 for its operation.

A physical address 23 includes an address translation table 24 which is stored at the main memory unit 2. The address translation table 24 is a table for translating between a physical address and a virtual address. The translation is controlled by a memory manager 91 of the operating system 12. Using the address translation table 24, the CPU 1 maps the address being used for the user program 22 to a user program 27 of the physical address space 23. CPU 1 also maps the areas in the device memories 26 and 26a of virtual address space 20 to the device memories 25 and 25a assigned to the physical address space 23. The device memory 25 is the local memory 8 of device 6. It is the memory that can be directly accessed from the CPU 1. The device memory 25a is a memory 80 of the disk controller 5. The device memory 25a is the memory that can be directly accessed from the CPU 1. As a result, the device memory 25 (i.e. the local memory 8), which is mapped to the device memory 26, is able to be specified by the user program 22 as either a source or a destination of transfer for file input/output. The user program 22 can instruct reading or writing of the file to the operating system using the device memory 26 treating it as a buffer. Thus, data transfer in file units for device 6 becomes possible.

Detailed operation for the embodiment 1 is described below.

When the device 6 or 6a is not designated as the source or destination of transfer, hereinafter it is referred to as "the device". On the other hand, when the device 6 or 6a should be distinguished as the source or the destination, it is referred to as "the source device" or "the destination device".

Figure 4:
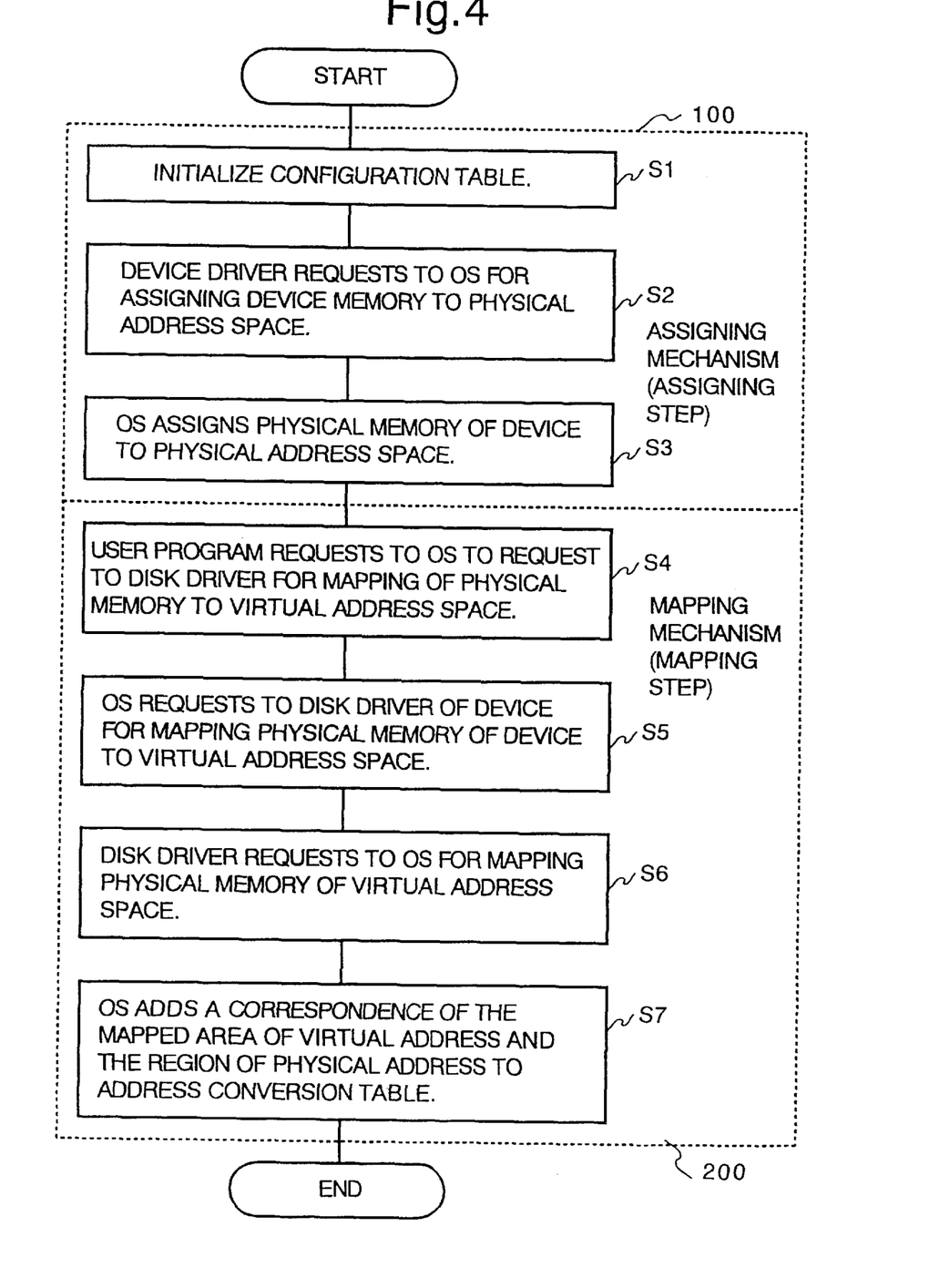
FIG. 4 is a flow chart for initialization process for the embodiment 1.

FIG. 4 is a flow chart of initializing process for the system.

Assigning Mechanism and Step 100

When starting the system, the configuration table 14 of device 6 or 6a is initialized by a initializer 92 of the device 6 or 6a (step S1). That is, the initializer 92 sets the memory size of local memory 8 or memory 80 to the memory size 86 of each configuration table 14. At step S1, the local memory 8 and the memory 80 are still not assigned to the physical address space 23, meaning that the local memory 8 and the memory 80 are set not to respond to a request made to the physical address space yet.

Next, the operating system 12 calls a initializer 93 in the device driver 13 of the device 6 or 6a. The initializer 93 in the device driver 13 for the device 6 or 6a requests to the operating system 12 for assigning the local memory 8 or memory 80 of the device 6 or 6a to the physical address space 23. The operating system 12 obtains a required size of physical memory from the configuration table 14 of the device 6 or 6a (step S2) as a memory size for local memory 8 or memory 80 of the device 6 or 6a.

The operating system 12 reserves the size of memory area obtained from configuration table 14 in an available space of the physical address space 23, and the operating system 12 assigns the reserved area as the physical address of device 6 or 6a. By doing so, the device memory 25 for local memory 8 and the device memory 25a for the memory 80 are assigned to the physical address space 23. The operating system 12 sets each top address assigned to the physical memory area as the physical address 85 to the corresponding configuration table 14 of the device 6 or 6a. Due to this, the device 6 or 6a is able to respond to reading and writing requests to the physical address issued at bus (step S3).

Initialization of the device driver 13 of the device 6 or 6a completes.

Mapping Mechanism and Step 200

When the user program 22 starts, it requests to the operating system 12 to call the device driver 13 of device 6 or 6a using a system call for I/O control. The user program 22 requests to the operating system 12 for mapping of the device memory 25 or 25a of the device 6 or 6a to the virtual address space 20 (step S4).

After receiving the system call for I/O control from the user program 22, the operating system 12 activates an I/O control procedure 95 in the device driver 13 of the device 6 or 6a, and the operating system 12 request to the I/O control procedure 95 for mapping the device memory 25 or 25a of the device 6 or 6a to the virtual address space 20. The I/O control procedure 95 of the device driver 13 of the device 6 or 6a obtains the first address of physical memory assigned to the device 6 or 6a (physical address 85) and a memory size 86, from the configuration table 14 of the device 6 or 6a (step S5).

The I/O control procedure 95 of the device driver 13 for the device 6 or 6a requests to the operating system 12 for mapping of the area specified by the top address of the physical memory (the physical address 85) and the memory size 86 to the virtual address space 20 (step S6).

The operating system 12 finds unused space of specified memory size in the virtual address space 20. The operating system 12 maps the device memory 25 to the user space 21. The operating system 12 maps the device memory 25a to the common area 33. The operating system 12 adds address translation information of these mapped areas of virtual addresses and these corresponding areas of the physical addresses to the address translation table 24. By doing so, address translation from virtual address areas in user space and common space to the addresses of physical address areas becomes possible. The operating system 12 returns the assigned virtual address to the device driver 13 of the device. The device driver 13 of the device 6 indicates the size of assigned virtual address and the size of physical memory of the device 6 to the user program 22 (step S7).

Translating Mechanism and Step 300

Figure 5:
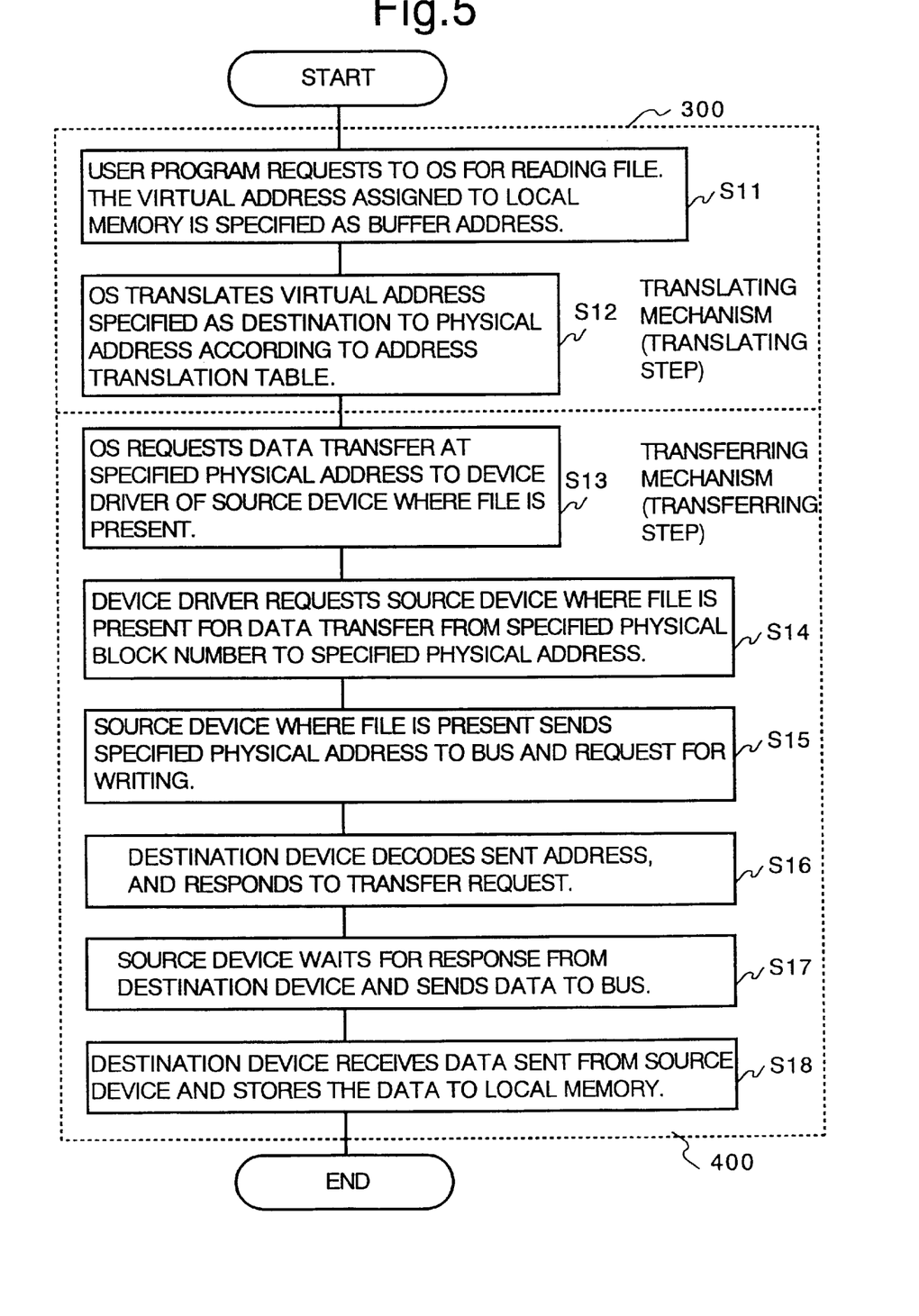
FIG. 5 is a flow chart for reading file for the embodiment 1.

FIG. 5 is a process flow chart of a case of transferring a file from the magnetic disk drive 4 to the local memory 8 of device 6. For the reason of convenience, the invention assumes that the file exists in the magnetic disk drive 4, however, as mentioned previously, by taking the magnetic disk drive 4 and the disk controller 5 as one device 6a, a transfer of the file is equivalent to a data transfer from the source device 6a to the destination device 6. The data transfer is a transfer of the logical file or a part of the file in a logical record unit.

Figure 6:
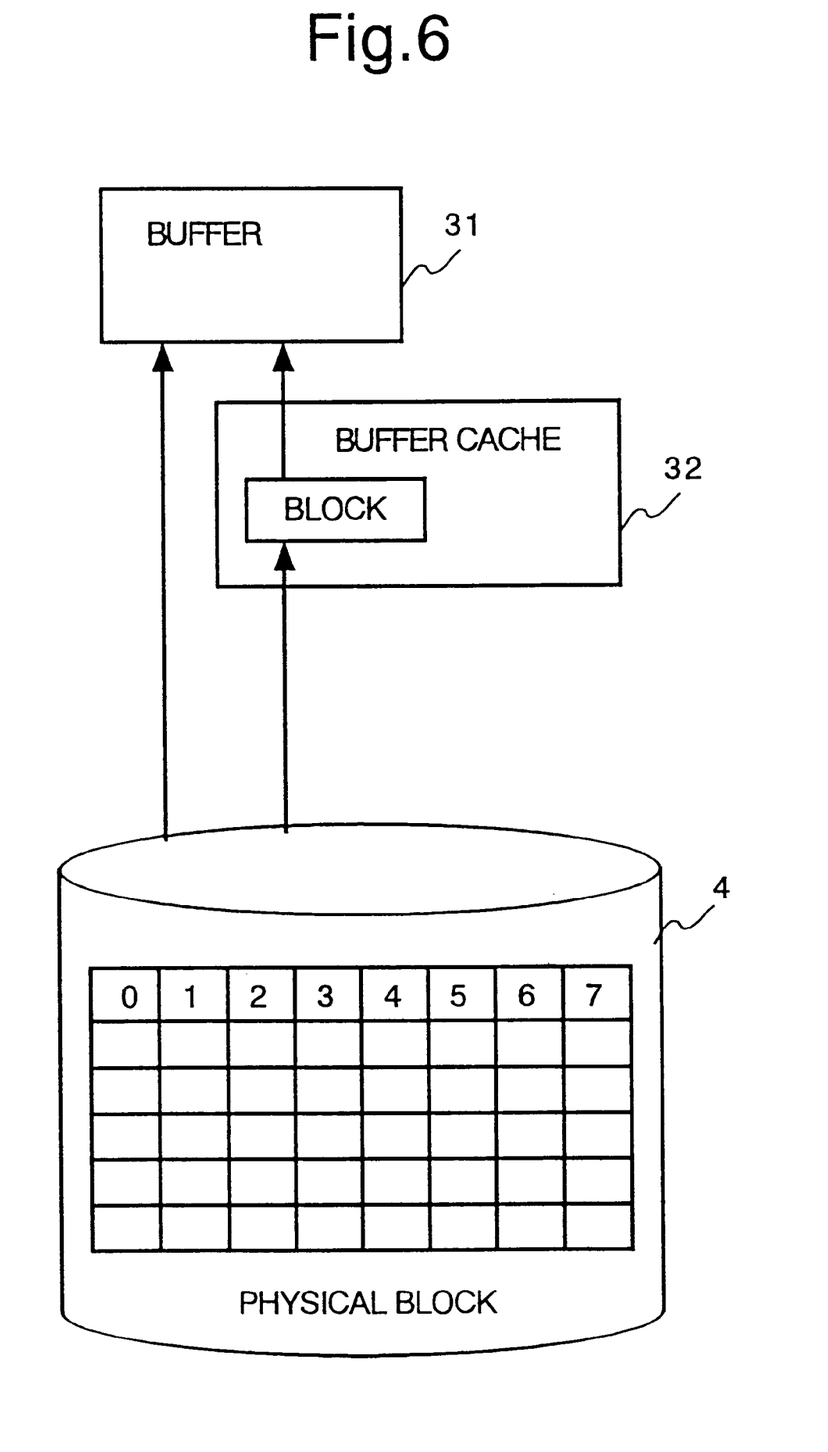
FIG. 6 is a schematic view of buffer of the embodiment 1.

The user program 22 requests to the operating system for a reading of the file to a buffer. At this time, the user program 22 specifies the assigned virtual address of device memory 25 in an initialization process, as a buffer address, and the user program 22 specifies the size of device memory 25 as data size for reading from file. As such, the user program 22 can treat the device memory 26 as a buffer. Next, the user program 22 specifies a bypass of buffer cache (step S11). FIG. 6 is a schematic view explaining reading of a file showing the following components: a buffer 31 which is set at virtual address space; and buffer cache 32 which is a part of main memory unit 2. Normally, a read file is transferred to the buffer cache 32 of main memory unit 2 without specifying the bypass of buffer cache. After that, the CPU 1 copies a context of the buffer cache 32 to the buffer 31. A number is physically put at the magnetic disk drive 4 in block units as physical block number, and the data in the magnetic disk drive 4 can be read by specifying the physical block number. Because, the present invention proposes a direct data transfer of file between devices without using the main memory unit, the method needs to bypass the buffer cache 32. The reading of file is performed directly from the buffer 31 (the device memory 26) so that no load is put on the CPU 1 and the main memory unit 2.

As mentioned above, the magnetic disk drive 4 and the disk controller 5 (device 6a) is a source device, and the device 6 is a destination device in this case. A file system manager 96 of the operating system 12 converts specified data offset (specified as source of transfer) to the physical block number of disk. The offset is a record position of the file, for example. Normally, a format of the file inside the disk is very complex, so when reading and writing of the file is requested to the operating system 12, the offset is firstly converted to the physical block number and the operating system 12 requests reading to the disk controllers 5 using the physical block number.

On the other hand, a memory manager 91 of the operating system 12 translates the virtual address specified as destination of transfer to the physical address according to the address translation table 24 (step S12). As a result, an obtained physical address becomes the physical address assigned to the local memory 8 of the destination device 6.

Transferring Mechanism and Step 400

An I/O manager 97 of the operating system 12 requests to the device driver 13 of disk controller 5 which corresponds to the disk where file is present, to transfer data present in physical block number specified as a source of transfer, to the physical address which is specified as a destination of transfer (step S13). This request is written to the device memory 26a. This means that the request is issued to the device driver 13 by specifying the memory 80 of disk controller 5.

The device driver 13 of disk controller 5 receives a request from the I/O manager 97 of operating system 12, and then requests to the disk controller 5 for data transfer from the specified disk in physical block number to the physical address specified as destination of transfer. This request is sent to the memory 80 of disk controller as a read command. The disk controller 5 reads the specified physical block from the disk and stores the physical block to a disk buffer 99 inside the disk controller 5 (step S14).

The disk controller 5 sends physical address specified as destination of transfer to bus and requests for writing (step S15).

The destination device 6 decodes the physical address sent by the disk controller 5. The physical address of the destination device 6 is specified as data transfer destination that the destination device 6 responds to the transfer request of disk controller 5 (step S16).

The disk controller 5 waits for response from the destination device 6, and sends the data stored in the disk buffer 99 to bus (step S17).

The destination device 6 receives the data sent by the disk controller 5, and stores the data inside the local memory 8 of the destination device 6. When the disk controller 5 completes the data transfer, an interrupt that notifies the completion of data transfer is sent to the CPU 1. Due to the interrupt sent to the CPU 1, the device driver 13 of the disk controller 5 indicates the completion of operation to the I/O manager 97 of the operating system 12. The I/O manager 97 of the operating system 12 indicates the completion of the file input operation to the user program 22 (step S18).

Figure 7:
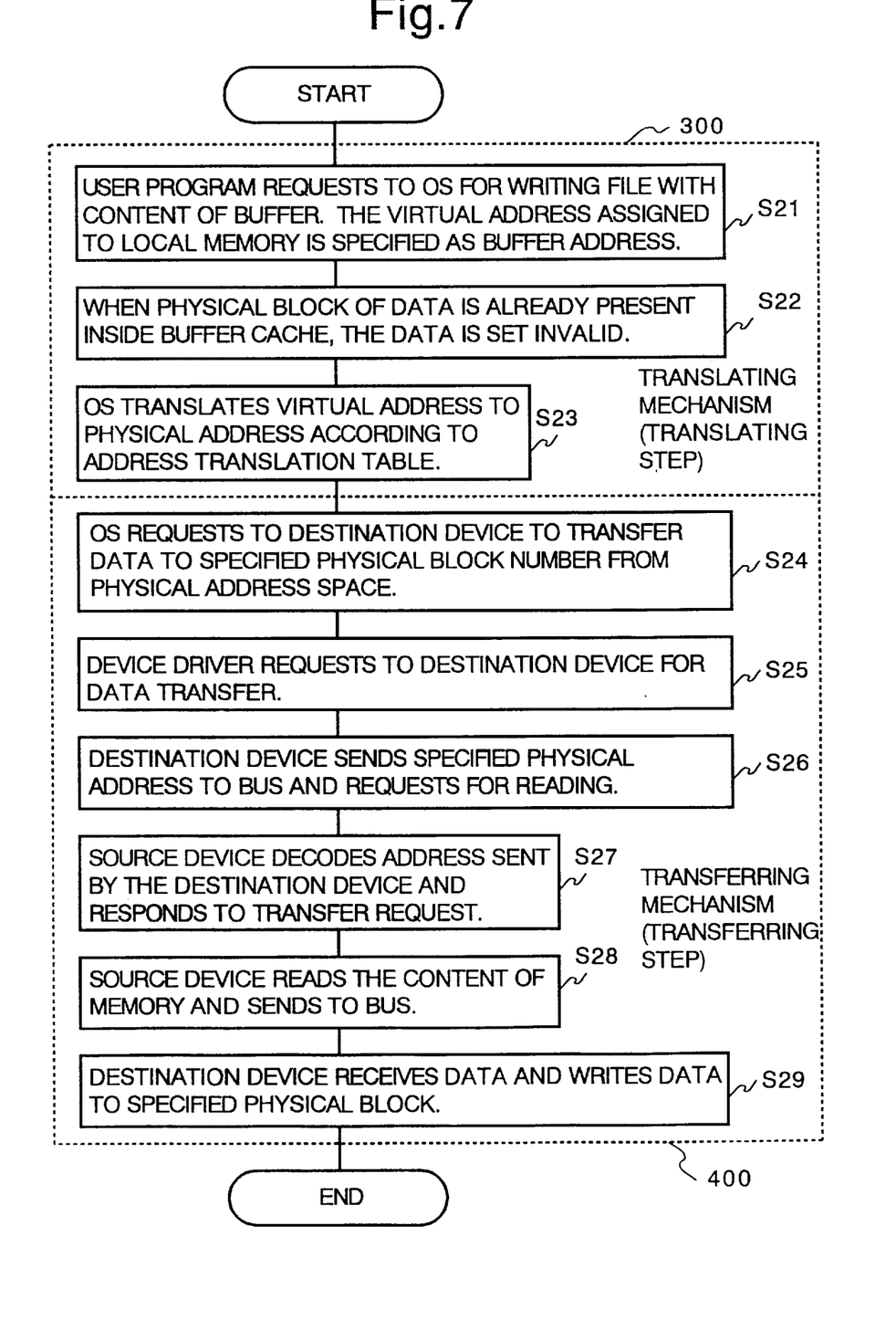
FIG. 7 is a flow chart for writing file for the embodiment 1.

FIG. 7 is a process flow chart for writing data to a file in the magnetic disk drive 4 (destination device 6a) from the local memory 8 of a source device 6. Similar to the case of reading, a file is assumed to be present in the magnetic disk drive 4.

Translating Mechanism and Step 300

The user program 22 requests to the operating system 12 for writing to a file with the context of a buffer. At this time, the user program 22 specifies the assigned virtual address of the device memory 25 as a buffer address, and specifies the memory size of the device memory 25 of source device 6 as a size of data for writing. The user program 22 thus treats the device memory 26 as a buffer. Next, the user program 22 specifies the bypass of buffer cache 32. A file system manager 96 of the operating system 12 converts a specified file offset (specified as transfer destination) to the physical block number of disk (step S21).

The buffer cache manager 98 of the operating system 12 checks whether data in physical block is present in the buffer cache. If the data is present, because this data is to be over-written by the data transfer, the data of the physical block in the buffer cache 32 is set invalid (step S22).

The memory manager 91 of operating system 12 translates the virtual address specified as the source of transfer to the physical address, according to the address translation table 24 (step S23). As a result, an obtained physical address is the top address of physical memory assigned to the local memory 8 of source device 6.

Transferring Mechanism and Step 400

The I/O manager 97 of operating system 12 requests to the device driver 13 of the disk controller 5 which corresponds to the disk where file is present, to transfer data to an area of the physical block number specified as the destination of transfer, from the specified physical address area as the source of transfer (step S24). This request is issued to the device memory 26*a*. That is, this request is issued to the device driver 13 by specifying the memory 80 of disk controller 5.

The device driver 13 of the disk controller 5 receives a request from the I/O manager 97 of the operating system 12, and then requests to the disk controller 5 for data transfer from the physical address specified as source of transfer to the physical block number specified as destination of transfer of disk (step S25). This request is written to the memory 80 of disk controller 5 as a write command.

The disk controller 5 requests for reading by sending the physical address specified as the source of transfer to the bus (step S26).

The source device 6 decodes the address sent by the disk controller 5. Since the physical address of the source device 6 is specified as the source of the transfer, the source device 6 responds to the transfer request of disk controller 5 (step S27).

The source device 6 sequentially reads the contents of the local memory 8 of the source device 6 and sends the contents to bus (step S28)

The disk controller 5 receives data sent by the source device 6 and stores the data into the disk buffer 99 inside the disk controller 5. The disk controller 5 writes the content stored data in the disk buffer 99 to the specified physical block. When the disk controller 5 completes data transfer, it send notification of data transfer completion to CPU 1 by an interruption. Due to the interruption sent to the CPU 1, the device driver 13 of disk controller 5 notifies completion of the operation to the I/O manager 97 of the operating system 12. The I/O manager 97 of the operating system 12 notifies completion of the file I/O operation to the user program 22 (step S29).

For the embodiment 1 as described above, by assigning the local memory 8 of the device 6 to the physical address space, and by mapping the assigned physical address to the virtual address space, the local memory 8 of the device 6 is treated as the buffer 39 in the user program 22. Thus, it becomes possible for the system of the embodiment 1 to read a file of the magnetic disk drive 4 and store the file directly on the device 6, or write a file directly from the device 6 to the magnetic disk drive 4.

Figure 12:
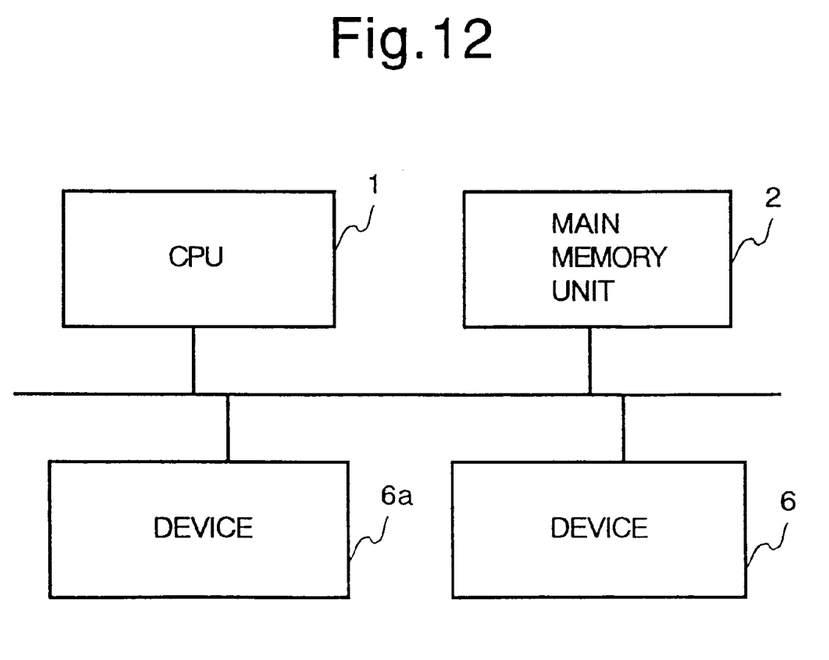
FIG. 12 is illustrating the other system configuration for the invention.
Figure 13:
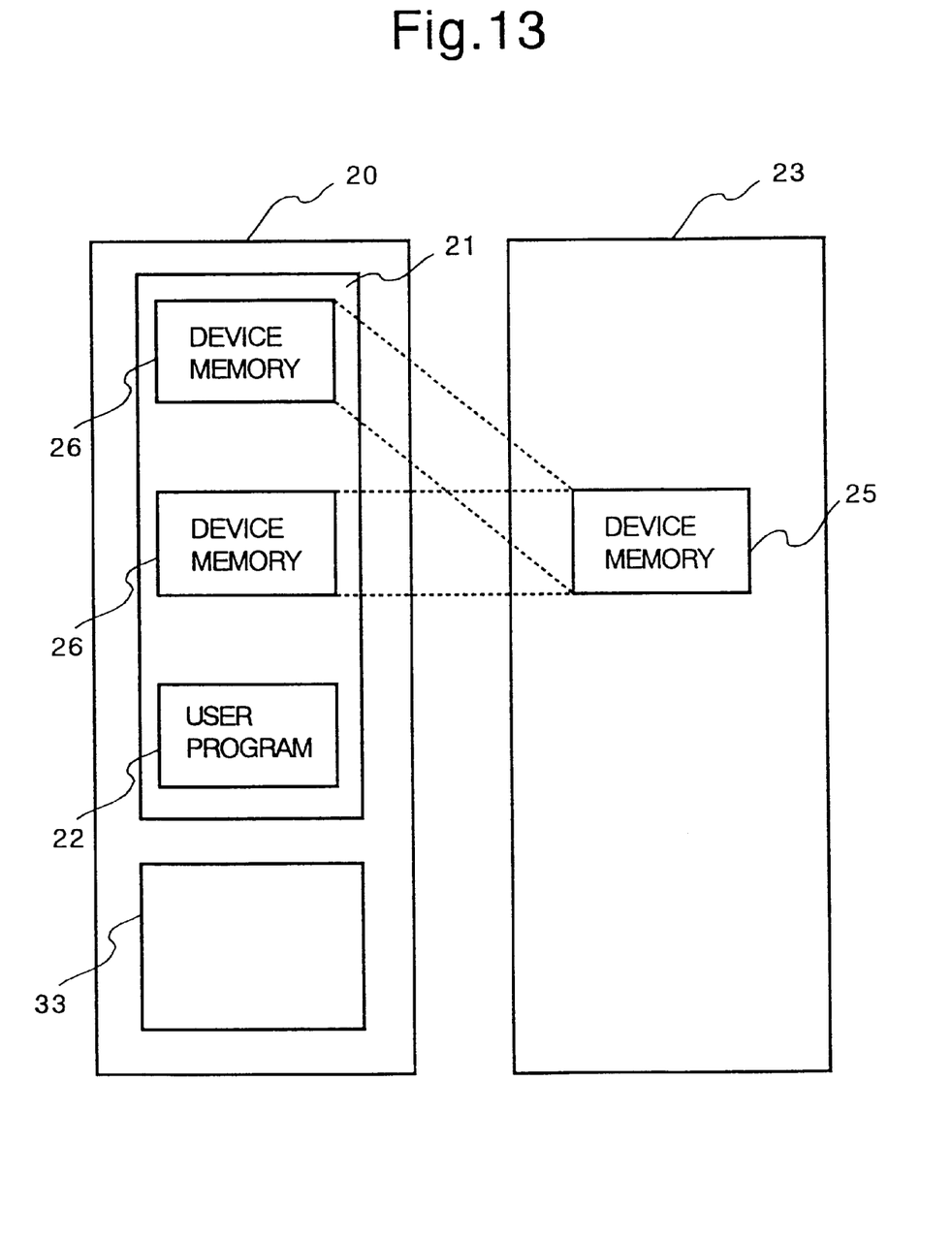
FIG. 13 illustrates another state of mapping for the invention.
Figure 14:
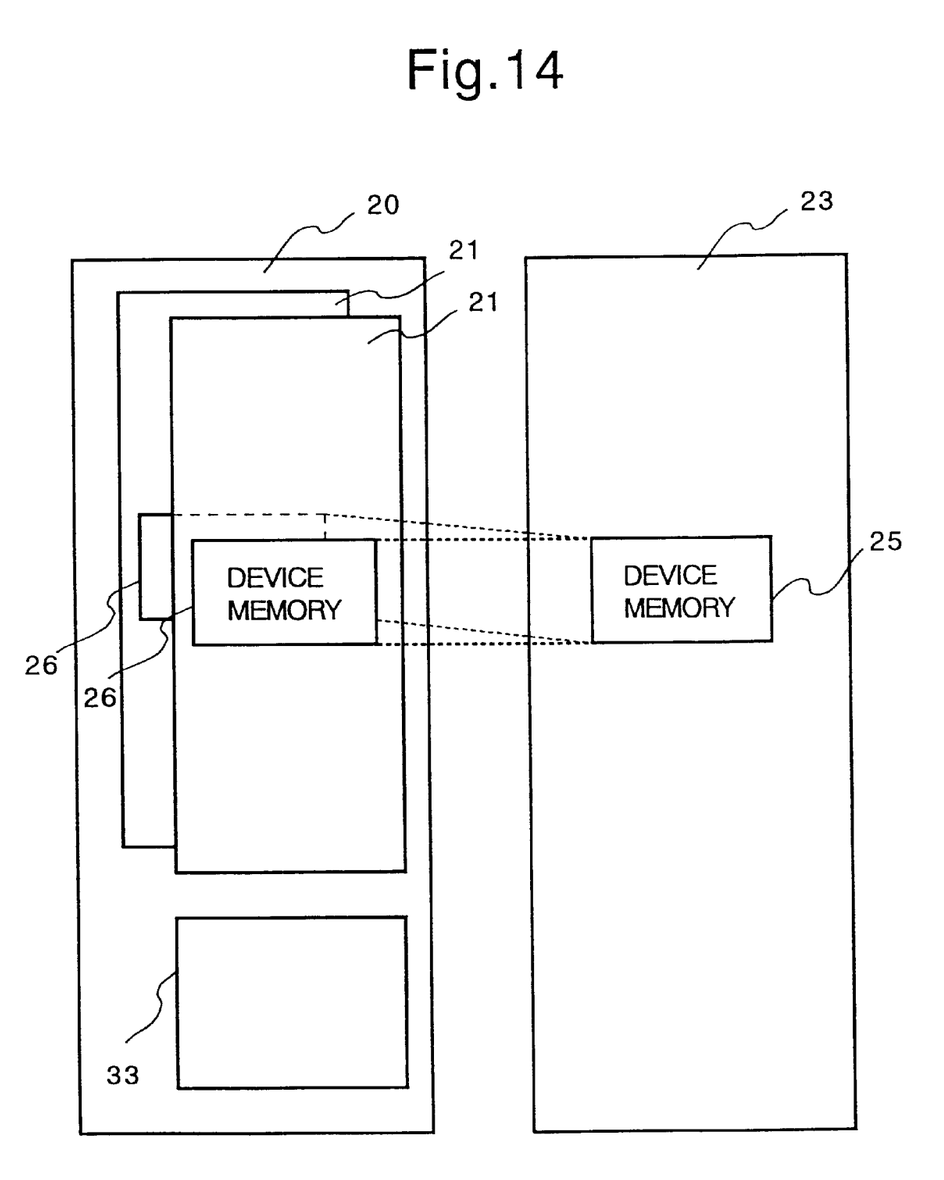
FIG. 14 illustrates other state of mapping for the invention.

The direct transfer described above is also possible in a system having one bus as shown in FIG. 12, or is possible in a system having various levels of buses coupled by a bus coupling unit as shown in FIG. 1, as long as the memories are assigned in one physical address space. In addition, as FIG. 13 shows, the device memory 25 can simultaneously be mapped to a plurality of address areas that are on the same user space. Further, as FIG. 14 illustrates, the device memory 25 can simultaneously be mapped to a plurality of address areas that are on the different user spaces. The data I/O method can either be a synchronous method or asynchronous method.

Embodiment 2.

Figure 8:
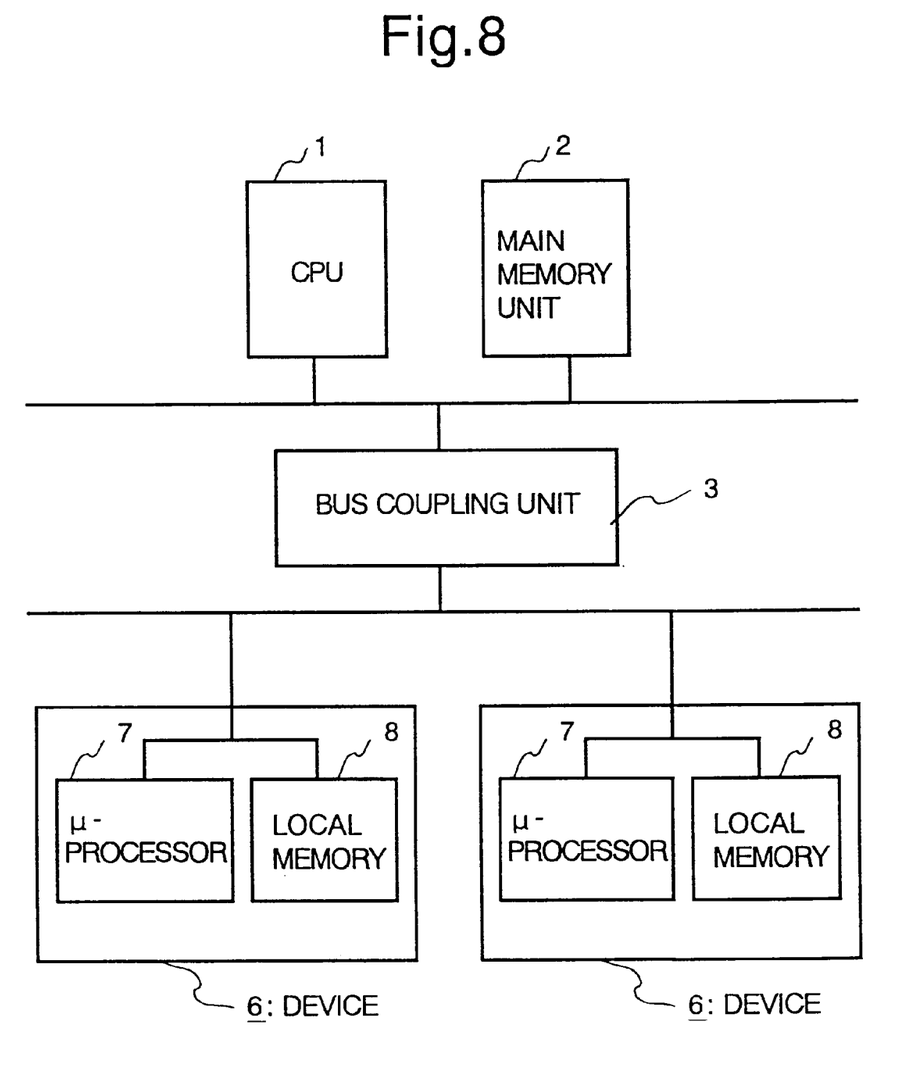
FIG. 8 is a schematic view of system configuration for the embodiment 2.

FIG. 8 is a schematic view of system configuration of data transfer between devices and a method for transferring data the embodiment 2. In this example, the disk controller 5 and the magnetic disk drive 4 of FIG. 1 are replaced with the device 6.

When data is transferred from a device 6 to an another device 6, the file reading and writing of the embodiment 2 is similar to the case with the magnetic disk drive 4 of embodiment 1. A number as a physical block is put on in block unit at the local memory 8 of one device 6, where physical blocks correspond to a file. By specifying a filename to transfer, and the microprocessor 7 having function similar to the disk controller 5, the entire file specified is transferred directly from one device 6 to the other device 6 using a physical block unit.

Since the invention is configured as described above having a mechanism in which the operating system maps device memory 25 to use space 21 with a request from user program 22, the invention is effective because only a minimum modifying and exchanging of the operating system 12 is involved.

The invention is configured to map the memory of processor to virtual address space, therefore, an effective direct data transfer method between devices is obtained where direct transfer is possible between devices using a logical unit.

Because transfers from the disk to the other device, and transfers from the other device to the disk are possible, direct reading and writing to the disk driver from the other device become possible.

Further, because the device is configured from a processor and memory, and the memory is designed to use a physical block unit for the transfer, the file in physical block unit can be directly transferred from one device to the other device.

The invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A data transfer apparatus for transferring data between a plurality of devices, comprising:

a central processing unit having a virtual address space;

a main memory unit;

a first device including a first device memory for inputting and outputting data;

a second device including a second device memory for inputting and outputting data, and storing the data as a file;

an operating system including a file system for identifying a device and an address to access data, receiving an input/output system call for reading and writing data stored in the second device from a user program, the user program specifying the file and a virtual address as one of a destination address and a source address of the data;

an address translation table for translating an address of the virtual address space to an address of a physical address space, wherein the virtual address space has a user space accessed by the user program;

a mechanism for assigning the first device memory of the first device to a first assigned address in the physical address space;

a mechanism for mapping the first assigned address of the first device in the physical address space to a first mapping address in the user space in the virtual address space; and a mechanism for transferring the data stored in the second memory device to and from the first assigned address in the physical address space, wherein the operating system receives the input/output system call for the data stored in the second device from the user program, the user program specifying the file and the first mapping address of the user space in the virtual address space, translates the first mapping address of the user space in the virtual address space to the first assigned address of the physical address space using the address translation table, and transfers the data stored in the second device using the address of the second device memory and the first assigned address as one of a destination address and a source address, so that the user program transfers the data stored in the second device as a file, using the input/output system call provided by the operating system, from and to the first device.

2. The data transfer apparatus of claim 1, comprising a disk drive, wherein the apparatus executes one of a data transfer from the disk drive to the first device, and a data transfer from the first device to the disk drive.

3. The data transfer apparatus of claim 1, wherein the first device includes a processor and the first device memory transfers data in physical block units.

4. The data transfer apparatus of claim 1, wherein the first device memory includes a configuration table for storing data regarding the configuration of the first device and the mechanism for assigning includes a mechanism for storing an uppermost address of the first device memory assigned in the physical address space as a physical address of the configuration table.

5. The data transfer apparatus of claim 4, wherein the mechanism for mapping includes a mechanism for storing a size of the first device memory mapped to the user space according to a memory size of the first device indicated in the configuration table.

6. The data transfer apparatus of claim 5, wherein the mechanism for translating includes a mechanism for converting the first device memory into a buffer of the user space for receiving data to be transferred.

7. The data transfer apparatus of claim 6, wherein the mechanism for transferring includes a mechanism for issuing a request to a source device of the first and second devices to transfer data to the buffer of the user space from the source device.

8. The data transfer apparatus of claim 5, wherein the mechanism for translating includes a mechanism for converting the first device memory into a buffer of the user space for storing data to be transferred.

9. The data transfer apparatus of claim 8, wherein the mechanism for transferring includes a mechanism for issuing a request to a destination device of the first and second devices to transfer data from the buffer of the user space to the destination device.

10. A data transfer method for transferring data between a plurality of devices of a data processing system having a central processing unit including a virtual address space, a main memory unit, a first device including a first device memory for inputting and outputting data, a second device including a second device memory for inputting and outputting data and storing the data as a file, an operating system including a file system for identifying a device and an address to access data, receiving an input/output system call for reading and writing data stored in the second device from a user program, the user program specifying the file and a virtual address as one of a destination address and a source address of the data, and an address translation table for translating an address of the virtual address space to an address of a physical address space, wherein the virtual address has a user space accessed by the user program, the method comprising:

a) assigning the first device memory of the first device to a first assigned address in the physical address space;

b) mapping the first assigned address of the first device in the physical address space to a first mapping address in the user space in the virtual address space; and c) transferring the data stored in the second device to and from the first assigned address in the physical address space, wherein the operating system receives the input/output system call for the data stored in the second device from the user program, the user program specifying the file and the first mapping address of the user space in the virtual address space, translates the first mapping address of the user space in the virtual address space to the first assigned address of the physical address space using the address translation table, and transfers the data stored in the second device, using the address of the second device memory of the first assigned address as one of a destination address and a source address, so that the user program transfers the data stored in the second device as a file, using the input/output system call provided by the operating system, from and to the first device.

11. The data transfer method of claim 10, wherein transferring data using the translated address includes one of transferring data from a disk drive to the first device, and transferring data from the first device to the disk drive.

12. The data transfer method of claim 10, wherein the first device includes a processor, and wherein transferring data using the translated address includes performing a memory transfer in physical block units.

13. The data transfer method of claim 10, wherein assigning the first device memory includes storing an uppermost address of the first device memory assigned in the physical address space as a physical address of a configuration table of the first device.

14. The data transfer method of claim 13, wherein mapping the assigned address includes storing a size of the device memory mapped to the first user space as a memory size of the first device based on the configuration table.

15. The data transfer method of claim 14, wherein translating the address of the user space includes converting the first device memory into a buffer of the user space where data is to be transferred.

16. The data transfer method of claim 15, wherein transferring data includes issuing a request to a source device to transfer data to the buffer of user space from the source device.

17. The data transfer method of claim 14, wherein translating the address of the user space includes converting the first device memory into a buffer of the user space for storing data to be transferred.

18. The data transfer method of claim 17, wherein transferring data includes issuing a request to a destination device to transfer data from the buffer of the user space to the destination device.

* * * * *